United States Patent [19]
Kuhn et al.

[11] 3,782,357
[45] Jan. 1, 1974

[54] INTERNAL-COMBUSTION-ENGINE VALVE-ROCKER AND VALVE-STEM LUBRICATION CIRCUIT

[75] Inventors: Karl Walter Kuhn, Saint-Germain-en-Laye; Marcel Pierre Ernest Marie Corbin, L'Isle Adam, both of France

[73] Assignee: Societe d'Etudes de Machines Thermiques, Saint-Denis, France

[22] Filed: Mar. 3, 1972

[21] Appl. No.: 231,611

[30] Foreign Application Priority Data
Mar. 8, 1971  France .............................. 7107906

[52] U.S. Cl. ........... 123/196 S, 123/90.33, 184/6.9, 340/270
[51] Int. Cl. ..................... F16n 29/04, F01m 11/10
[58] Field of Search ......................... 340/239, 270; 123/196 S, 90.33; 184/6.4, 105 B, 6.9

[56] References Cited
UNITED STATES PATENTS

| | | | |
|---|---|---|---|
| 2,149,898 | 3/1939 | Pagliaroni | 184/6.9 |
| 2,716,165 | 8/1955 | Pfitzner | 340/270 X |
| 2,717,990 | 9/1955 | Person | 340/239 R X |
| 3,335,736 | 8/1967 | Liebel et al. | 184/103 A X |
| 3,670,319 | 6/1972 | Ohtani | 123/196 S |
| 1,695,348 | 12/1928 | Scheel | 184/6.9 X |
| 1,935,496 | 11/1933 | Baughman et al. | 123/90.33 X |
| 1,563,493 | 12/1925 | Jannes | 184/6.9 |

Primary Examiner—Manuel A. Antonakas
Attorney—Francis T. Carr et al.

[57] ABSTRACT

A valve-rocker and valve-stem lubrication circuit for an internal combustion engine provided with cooled valves and a general engine-lubricating circuit, wherein the improvement consists in that said valve-lubricating circuit is completely independent of said general engine-lubrication circuit.

2 Claims, 1 Drawing Figure

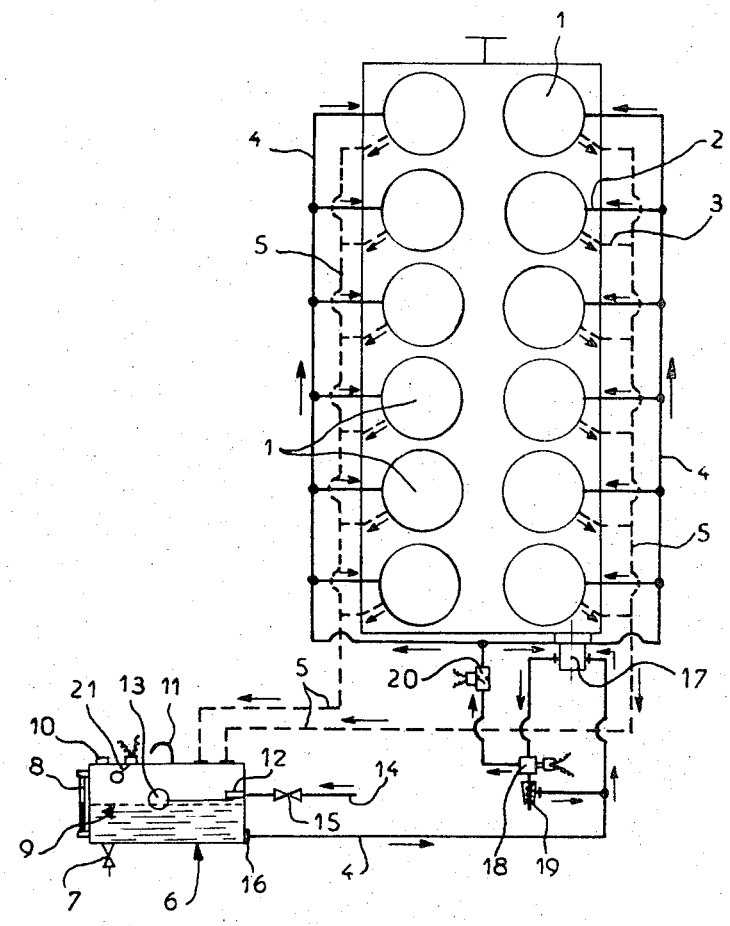

INTERNAL-COMBUSTION-ENGINE VALVE-ROCKER AND VALVE-STEM LUBRICATION CIRCUIT

The present invention relates to and has essentially for its object a valve-stem and valve-rocker lubrication circuit for an internal combustion engine, more particularly of the type provided with exhaust valves cooled by water circulation and/or with exhaust-valve guide bodies cooled by water circulation.

More specifically, the main purpose of the invention is to provide a valve-rocker and valve-stem lubrication circuit so designed that, in case of casual leakage or infiltration of the valve and/or guide-body cooling water, the leaking water is absolutely prevented from mixing with the oil of the general internal lubrication circuit of the engine, which would lead to a risk of deterioration of the latter or at least the loss of a considerable amount of oil.

It is already known to use means for avoiding such a risk. For instance, a sealed partition is provided to separate an upper compartment containing the movable water-pipe connections liable to leakage, from a lower chamber containing the whole of the valve-actuating gear.

Such arrangements involve structural complications, for a sealed casing must be provided above the valves instead of the simple conventional cover covering the rockers. In addition to the complexity of this structure, the access to the valves is difficult when they are to be disassembled and, moreover, the removal of the casing requires considerable time. Furthermore, the suspended inert mass of the valves is increased, therefore the inertia forces are more important, so that it is necessary to provide reinforcement means for the valve return springs in order to avoid a prohibitive specific contact-pressure (Hertz) capable of deteriorating the cams and rollers.

The invention enables any risk of water infiltration into the general engine lubrication circuit to be prevented while at the same time avoiding the aforementioned drawbacks.

To this end, the internal-combustion-engine valve-rocker and valve-stem lubrication circuit according to the invention is characterized in that it is completely independent of the general engine lubrication circuit.

It is thus readily understood that even in case of casual infiltration of the valve and/or the valve guide-body cooling water into the valve-rocker and valve-stem lubrication oil, there is no risk of water ingress into the general lubrication circuit, since the two circuits are separate from one another.

According to another feature of the invention, the valve-rocker and valve-stem lubrication circuit comprises a signal device warning of any casual infiltration of water into the said circuit. Thus, the operator warned of such an occurance by the signal device may take all necessary steps to remedy the situation. Such an arrangement is particularly useful where the engines are controlled automatically.

According to another feature of the invention, in a lubrication circuit comprising an oil tank and at least one circulation pump sucking the oil from the said tank, the signal device is mounted on the said tank and comprises means of detection of the liquid-level in the said tank.

According to still another feature of the invention, the said signal device comprises an electric contact responsive to a rise of the liquid level in the oil tank as a result of casual water infiltration.

The invention will be better understood and other purposes, features and advantages of the latter will appear as the following explanatory description proceeds with reference to the appended diagrammatic drawing given solely by way of example illustrating one form of embodiment of the invention and wherein the single FIGURE is a diagrammatic view of a separate valve-rocker and valve-stem lubrication circuit according to the invention, provided with a signal device.

Referring to the appended FIGURE it is seen that the separate valve-rocker and valve-stem lubrication circuit relates to an internal combustion engine comprising twelve cylinders, twelve sets of water-cooled exhaust valves and water-cooled valve guide-bodies and, therefore, twelve sets of valve-rockers, indicated generally by circles 1. With each set of valve-rockers and valves 1 is associated an incoming conduit 2 and an outgoing conduit 3 for the lubrication oil. All the incoming conduits 2 and outgoing conduits 3 are respectively connected with a general incoming conduit 4 and a general outgoing conduit 5 for the oil serving to lubricate the valve-rockers and valve-stems 1. In a manner known per se. the conduits 4 and 5 are connected with an oil tank 6. The latter is provided with a drain cock 7, an indicator 8 showing the oil level 9, a manual filling orifice 10, a vent or breather 11 maintaining the atmospheric pressure above the oil level 9. Further, above the level 9 in the oil tank 6 is arranged a cock 12 provided with a float 13 for automatic oil-make-up, which communicates externally with the oil supply conduit 14 proceeding for instance from the camshaft oil-distributor (not shown). On the conduit 14 is mounted a disconnecting cock 15. At the outlet 16 of the oil tank 6 the general conduit 4 is connected to a pump 17 driven for instance by the camshaft end, to the distributing block 18 and to the oil-pressure regulating valve 19, and then to the warning or safety flow-control device 20 indicating the admissible minimum-limit value of the flow of circulating oil. The oil is thereafter conveyed to all the valve-rockers and valve-stems 1 and flows back to the tank 6 through the various return conduits 5.

In the independent circuit thus described there is provided a signal device serving to warn of any infiltration of the valve and/or valve-body cooling water into the said circuit. The signal device consists for instance of an electric circuit and is operated by a float contact 21 in case of abnormal rise of the oil level 9 in the tank 6. When there is an infiltration of valve and/or valve-body cooling water into the valve-rocker and valve-stem lubricating oil circuit described above, the level 9 of the liquid in the tank 6 rises as a result of the presence of water, the float contact 21 detects the position of this level when it reaches a critical value, and directly operates the warning signal.

It is thus obvious that such a circuit is simple in design while at the same time discarding any risk of water leakage into the general internal lubrication circuit of the engine.

Of course, the invention is by no means limited to the form of embodiment described and illustrated, which has been given by way of example only. In particular, it comprises all the means constituting technical equivalents to the means described as well as their combinations, should the latter be carried out according to the spirit of the invention.

What is claimed is:

1. In an internal combustion engine of the type including valve-rockers associated with water cooled valves and a general engine lubricating circuit, that improvement comprising a separate valve-rocker and valve-stem lubricating circuit, including a separate oil tank connected in said valve-rocker and valve lubricating circuit, an oil circulating pump in said last-named circuit for pumping oil from said tank to said valve-rockers and water-cooled valves, at least one oil return circuit connected to said valve-rockers and valves and to said tank for returning oil to the latter, a distributing block connected in said second named circuit, a safety flow control valve in said second named circuit, a float operated signalling device in said tank responsive to oil level in said tank to warn of abnormal rise of oil level in said tank, and a further float controlled oil make-up valve in said tank to admit introduction of oil make-up into said tank from an oil supply source.

2. In an internal combustion engine of the type including valve-rockers associated with water-cooled valves and a general engine lubricating circuit, that improvement comprising a separate valve-rocker and valve-stem lubricating circuit, said last-named circuit comprising an oil tank, an oil circulating pump, and an oil supplying circuit for supplying oil from said tank to said valve-rocker and said water-cooled valves, at least one oil return circuit connecting said valve-rockers and water-cooled valves to said tank, means for selectively isolating said tank from said general engine lubricating circuit, automatic means for oil make-up in said tank, and a signal device warning of any water infiltration into said valve-rocker and valve-stem lubricating circuit, said signal device being mounted on said tank and comprising means for detecting the oil level in said tank and an electric contact provided with a float responsive to a rise of the oil level in said tank as a result of water infiltration thereto.

* * * * *